United States Patent [19]

Sweeney

[11] Patent Number: 4,573,714
[45] Date of Patent: Mar. 4, 1986

[54] MARINE RISER COUPLING ASSEMBLY

[75] Inventor: Thomas F. Sweeney, Ventura, Calif.

[73] Assignee: Vetco Offshore, Inc., Ventura, Calif.

[21] Appl. No.: 488,835

[22] Filed: Apr. 26, 1983

[51] Int. Cl.⁴ .............................................. F16L 23/02
[52] U.S. Cl. .................................... 285/363; 285/114; 285/370; 285/137.2
[58] Field of Search .................... 285/137 A, 370, 368, 285/363, 114

[56] References Cited

U.S. PATENT DOCUMENTS 1,045,389  11/1912  Gillmor et al. ................. 285/368 X

FOREIGN PATENT DOCUMENTS 2059486   6/1972   Fed. Rep. of Germany ...... 285/363
103448   12/1962   Netherlands ......................... 285/368
28875    1/1908   Switzerland ......................... 285/370

Primary Examiner—Richard J. Scanlan, Jr.
Attorney, Agent, or Firm—Edward L. Kochey, Jr.

[57] ABSTRACT

A marine riser coupling assembly includes bolted flanges (26, 28) with a raised face (30) around the inner edge and a raised face (32) around the outer edge. In the area of the bolt holes (38), there is a recess (34) between the two raised faces around the entire circumference. Bending strain of bolts (42) is thereby reduced.

1 Claim, 2 Drawing Figures

MARINE RISER COUPLING ASSEMBLY

BACKGROUND OF THE INVENTION

This invention relates to marine risers for deep subsea drilling and production and in particular to a coupling assembly therefor.

Marine risers are run from floating vessels or platforms to subsea wellheads for drilling and production operations. The riser sections are tubular, in the order of 20 inches in diameter and fifty feet long. These are assembled at the surface and run from the vessel or platform to a subsea wellhead.

The riser is usually highly tensioned at its upper end to avoid buckling, and is also subject to bending caused by water currents and/or vessel drift. These bending forces are cyclical and therefore have the potential of causing fatigue failure of riser components. The bending not only places the bolts on the tension side of a flanged connector assembly in tension but flange deflection and rotation causes bending of the bolts. The bending of these bolts is of concern since they are not only normally highly loaded but being threaded they have inherent stress concentration locations where this high cyclical stress occurs.

SUMMARY OF THE INVENTION

It is an object of the invention to reduce the cyclical bending stress in the bolts of a flanged marine riser coupling assembly.

Each of the couplings of the assembly includes a tubular portion which is welded to the riser pipe section and a flanged portion for mutual mating. The flange has a raised innerface and outerface with a recessed portion therebetween, preferably with the recessed portion being greater than 50% of the width of the flange. The bolt holes and bolts are located through the recessed portion so that when the assembly is made up both the inner and outer faces are brought into highly preloaded contact.

The recess tends to concentrate the bolting load at the inner edge of the coupling assembly where tensile and bending loads tend to separate the coupling, as compared to a flat face flange. The outer face permits tightening of the joint without bending of the flange and also provides a force and moment arm which further deters initial separation of the coupling of the inner surface and limits the separation once it does occur. This action of the coupling in detering the initial separation of the inner edge of the coupling and limiting the separation thereafter also limits the rotation of the opposing bolt head surfaces and accordingly the rotation or bending of the bolt.

The invention has particular application in a coupling which has an internal pin member which seals radially against the couplings. Absent this the initial separation of the abutting surfaces can cause leakage and the ability of the coupling to limit the rotation becomes less important.

DESCRIPTION OF THE PREFERRED EMBODIMENT

Figure 1:
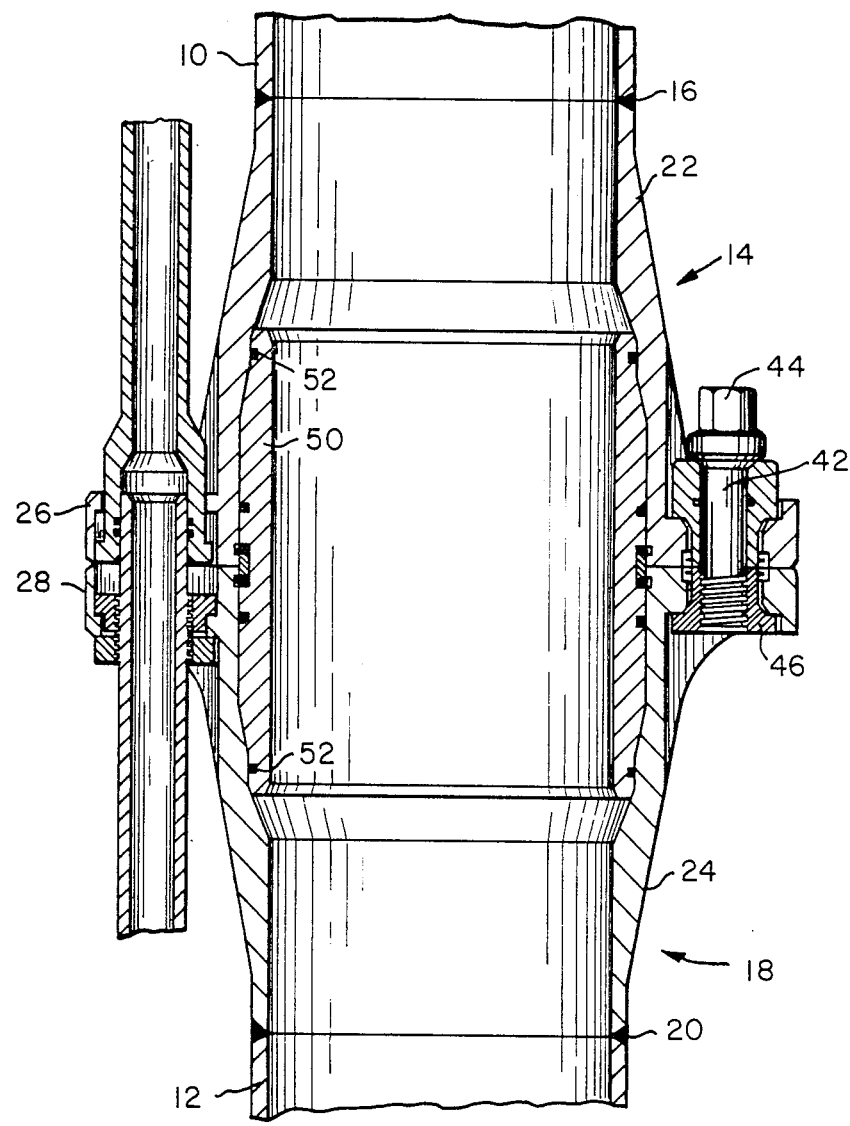
FIG. 1 is a sectional side elevation through the assembled connector assembly.
Figure 2:
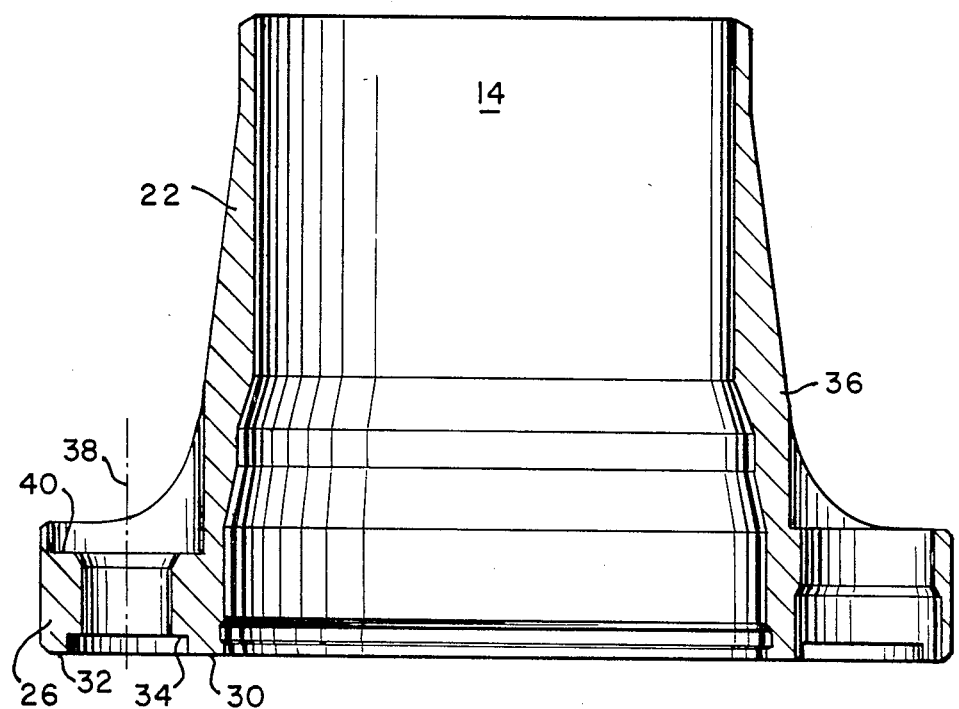
FIG. 2 is a sectional side elevation through one connector illustrating the recess.

A marine riser run from a floating vessel to a subsea wellhead is formed of a plurality of marine riser pipe sections 10 and 12. Each of these will normally be about 50 feet long and approximately 20 inches in outside diameter. A first coupling 14 is welded at location 16 to riser pipe section 10 while coupling 18 is welded at location 20 to riser pipe section 12. Each coupling has a tubular portion 22, 24 and a flange portion 26, 28 integral with the tubular portions.

Each flange has on the face thereof a raised face 30 around the entire inner circumference and a raised face 32 around substantially the entire outer circumference. A recess 34 located between the two raised faces extends around the entire circumference. Preferably the radial dimension of the recess 34 is greater than 50% of the total radial dimension of the flange face consisting of faces 30 and 32 as well as recess 34. This provides significant distribution of the loading in the manner disclosed below.

Each coupling has a substantially size fillet 36 which extends from the upper flange surface at a location outside of the center line of both holes to a distance up the riser substantially twice the radial distance or depth of the flange. There are six bolt holes 38 around the periphery of the flange each having a flat 40 machined through the fillet. A plurality of bolts 42 pass through the bolt holes with bolt head 44 and bolt nut 46 operating against the respective flats on the flange.

When the coupling is made up, the bolt is tensioned so that each of the faces come into highly loaded contact. This provides a higher load at each of the faces then would occur in a flat face flange. Also at this time the bolt is preloaded and accordingly strained to the preloaded level. As direct tension is placed on the riser the bolt restrains the movement at a location eccentric of the load. Accordingly, the inner faces 30 tend to separate but high load is accepted before separation because of the high preload placed on these faces. Since the bolt is more elastic then the compressed flange very little additional strain occurs in the bolt up to the point of separation. Accordingly, cyclical loading up to the preload level can occur with only a nominal strain variation in the bolt.

When bending of the riser takes place, the tension side of the coupling assembly reacts in substantially the same manner as in direct tension. Marine risers experience high cyclical bending loads, thereby cycling this tension loading.

In the absence of the outer face the upper flange would tend to rotate downwardly with tensile loading as the flange tends to separate and this bending would increase significantly after the faces separated. With the outer face 32 being in contact, this offers a moment arm resisting the bending of the flange so that the bolting surfaces 40 tend to remain parallel to one another thereby decreasing bending of the bolts 42. With the bolts already being highly loaded in tension and having threads on them, the avoidance of additional loading, of a bending nature is important to avoid fatigue cracking of the bolt.

It can be seen that the strain range of the bolt is reduced. Since it is strain range that affects fatigue damage, the life of the marine riser coupling is enhanced.

An internal sleeve 50 is supplied which has radial sealing means 52 between the sleeve and each of the couplings. With this pin and box type seal, separation at the flange interface 30 is tolerable without leaking of the connection. While a floating pin 50 is shown, a pin welded to one of the members could also be employed with the subject flange. With either of the pin and box type connections this invention has particular utility since the outer face 32 is especially effective in limiting the bending after the separation of face 30 which could not be tolerated in connections which require a face seal at all times.

Accordingly, it can be seen that even though the joint is designed to maintain the faces 30 in contact under normal expected loads, the invention provides a structure which is readily capable of resisting unforeseen high loads. Furthermore, even before separation of the inner faces, the bending of the bolt is reduced.

I claim:

1. A marine riser coupling assembly, adopted to withstand high tension and cyclical bending loads comprising:

a first coupling having a tubular portion welded to a riser pipe section, and a flange portion integral with the tubular portion;

a second coupling having a tubular portion welded to a riser pipe section, and a flange portion integral with the tubular portion;

each of the flanged portions having on the face thereof, a raised face around the entire inner circumference, a raised face around substantially the entire outer circumference, and a recess around the entire circumference between the raised faces;

each flanged portion having a plurality of bolt holes through the area of the recess and alignable with each other;

a plurality of bolts through said bolt holes securing the flange portions to one another with both the inner and outer faces in highly loaded contact;

an external fillet connecting the inboard side of the flanged portion and the outer surface of the tubular portion, the fillet extending from the location outboard of the center line of the bolt holes with the dimension along the tubular portion being significantly greater than the dimension across the flange; and flat surfaces machined through said fillet at the location of said bolt holes.

* * * * *